Nov. 19, 1940.   F. J. O'BRIEN ET AL   2,222,514
DOUBLE TIER OVEN
Filed May 11, 1938   6 Sheets-Sheet 1
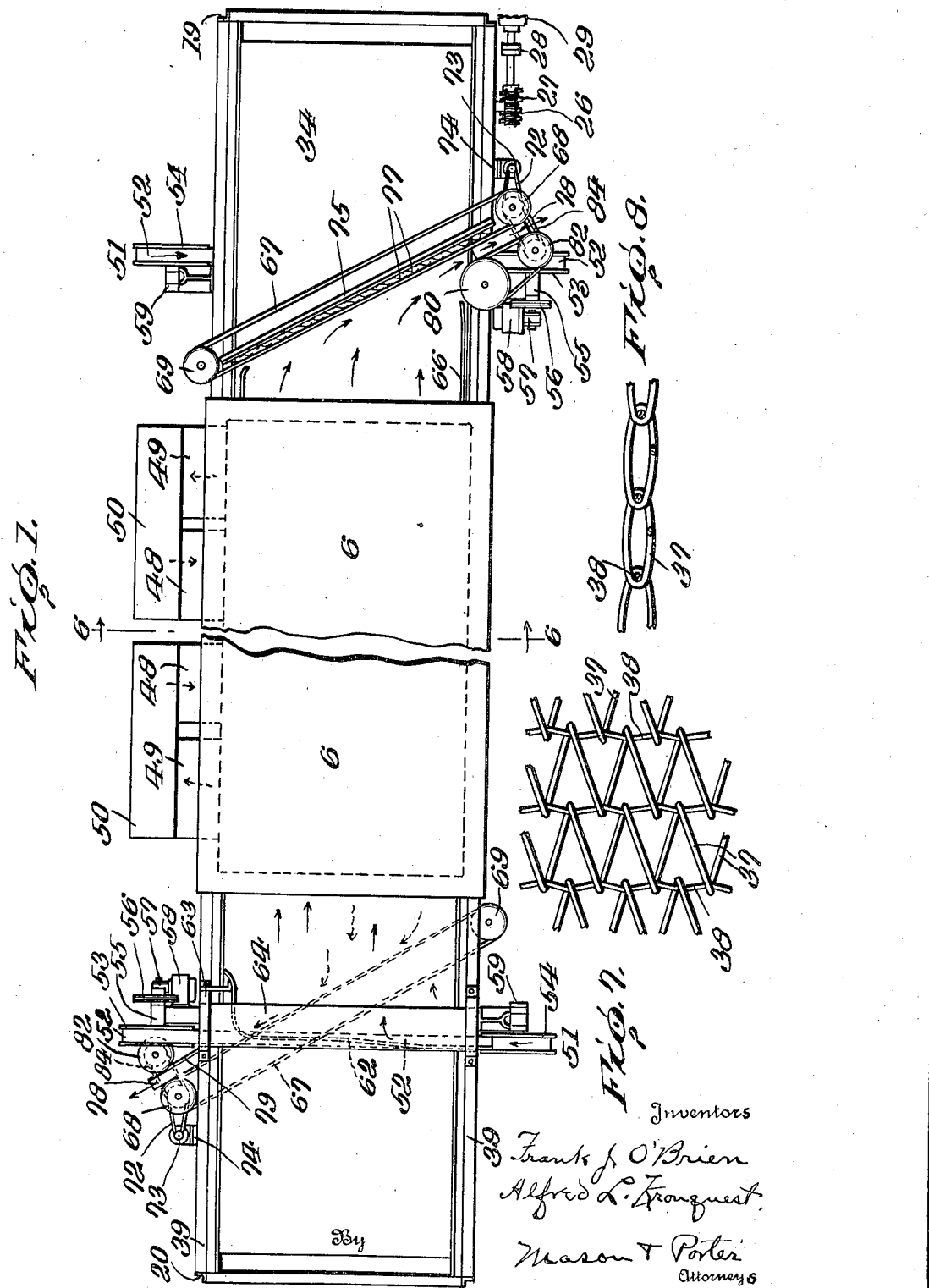
Inventors
Frank J. O'Brien
Alfred L. Tronquest
By Mason & Porter
Attorneys

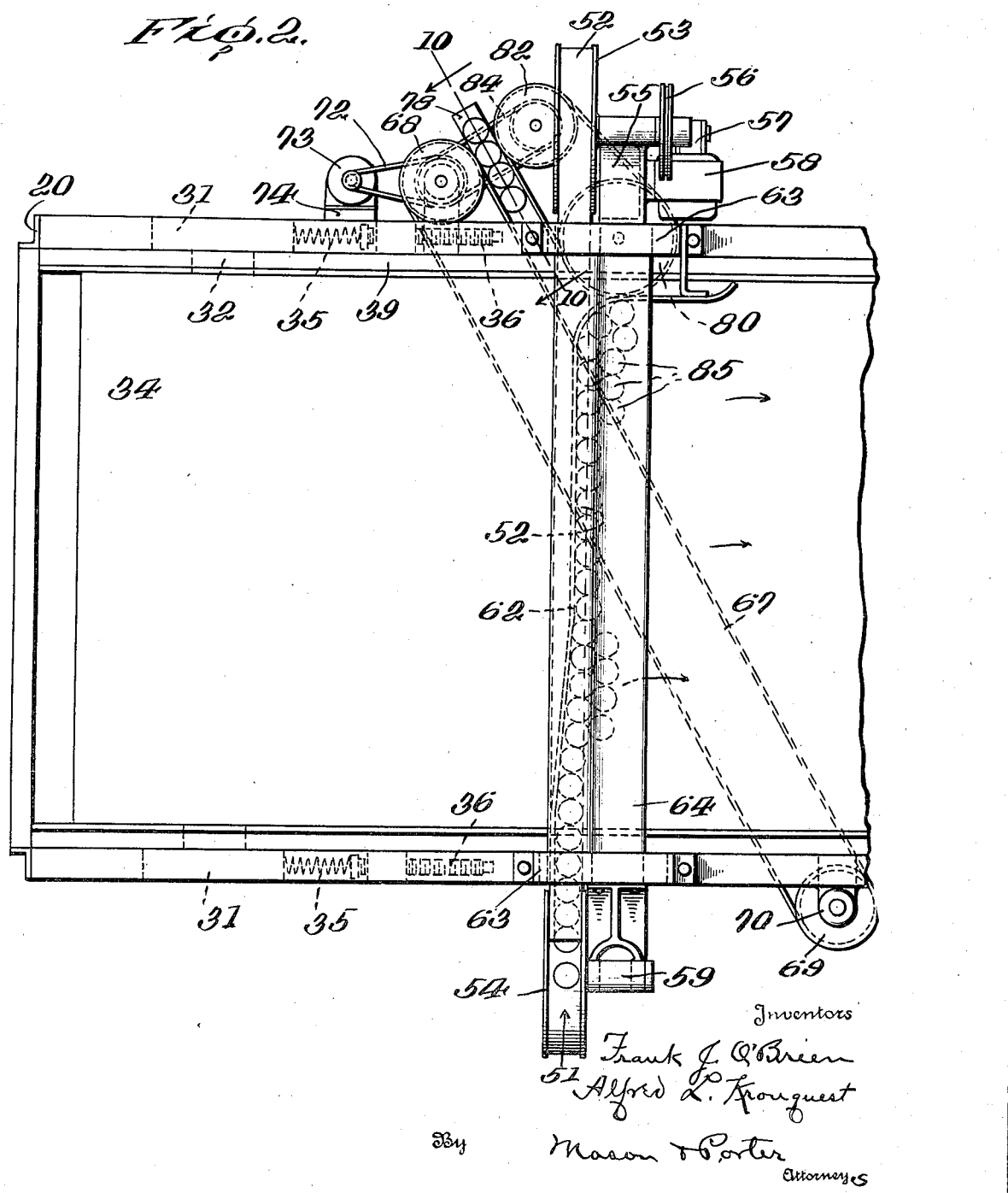

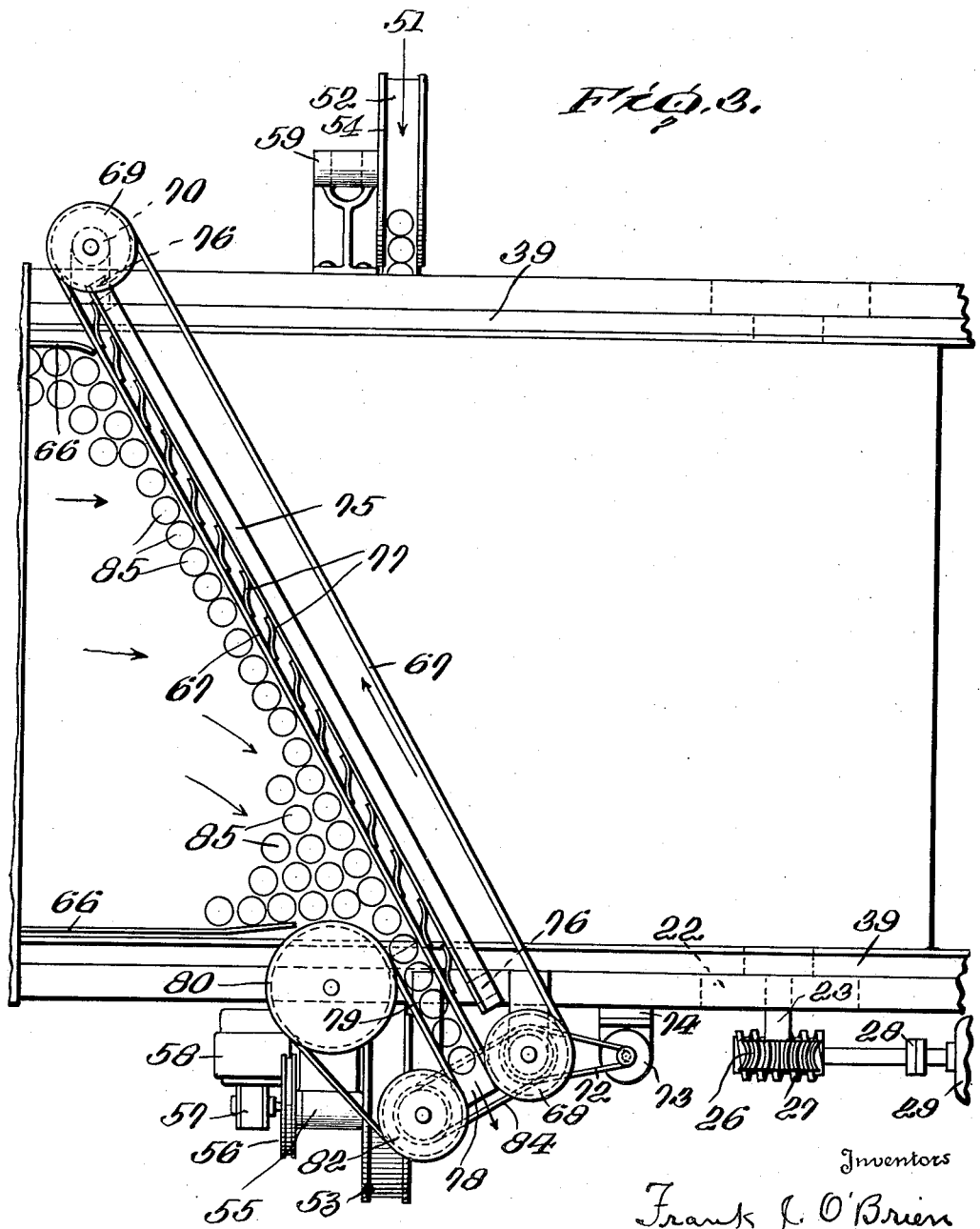

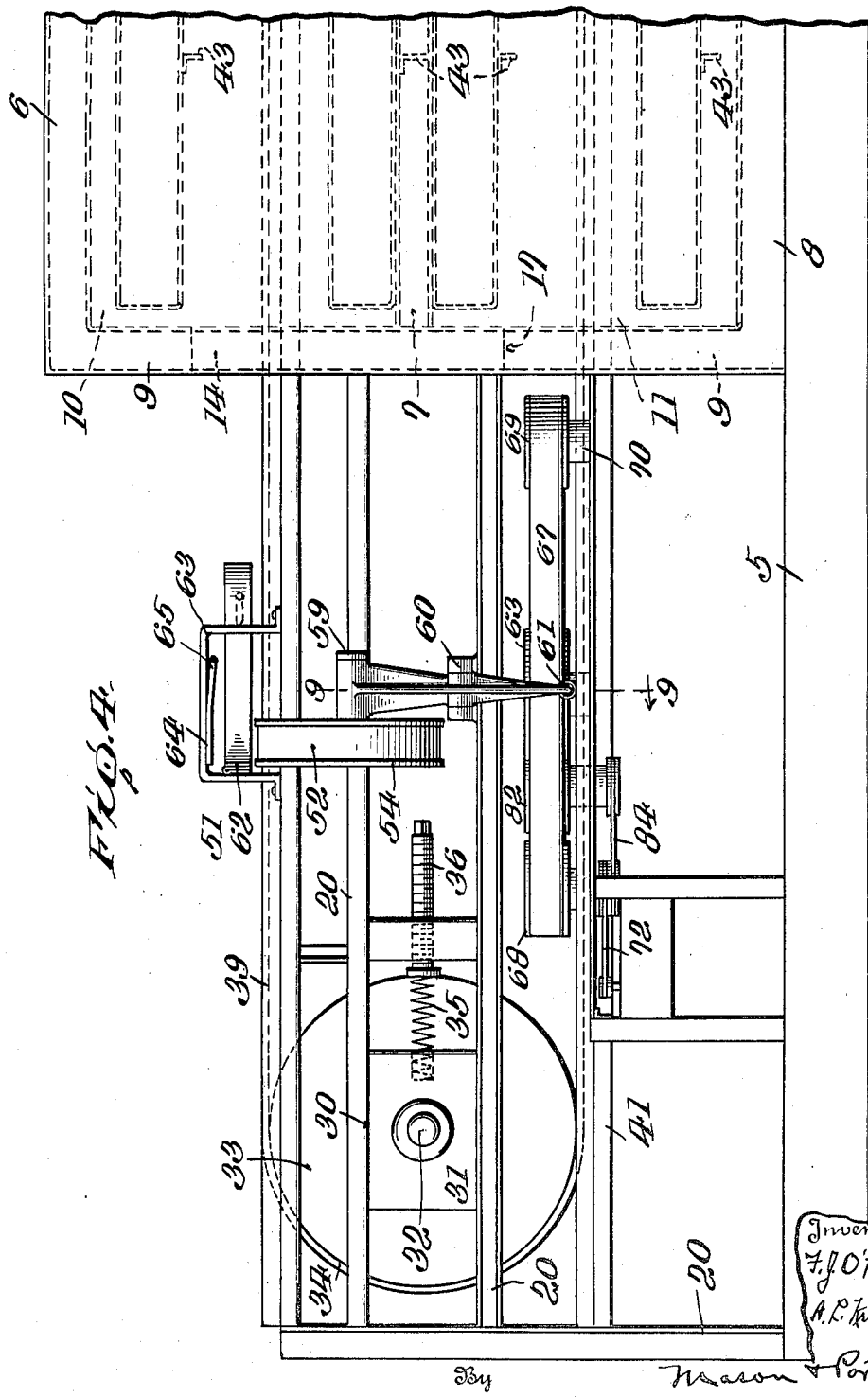

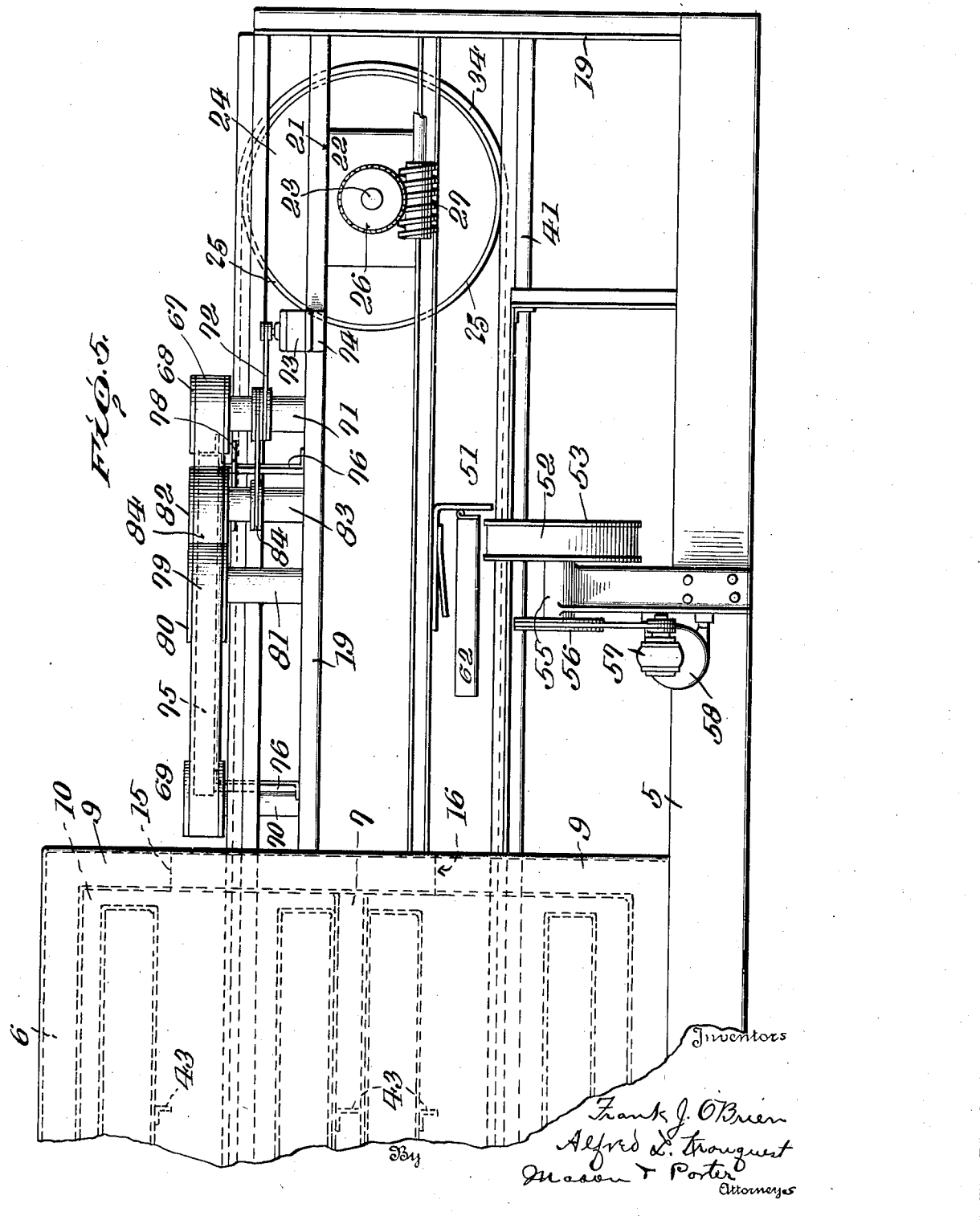

Nov. 19, 1940.  F. J. O'BRIEN ET AL  2,222,514
DOUBLE TIER OVEN
Filed May 11, 1938  6 Sheets-Sheet 6
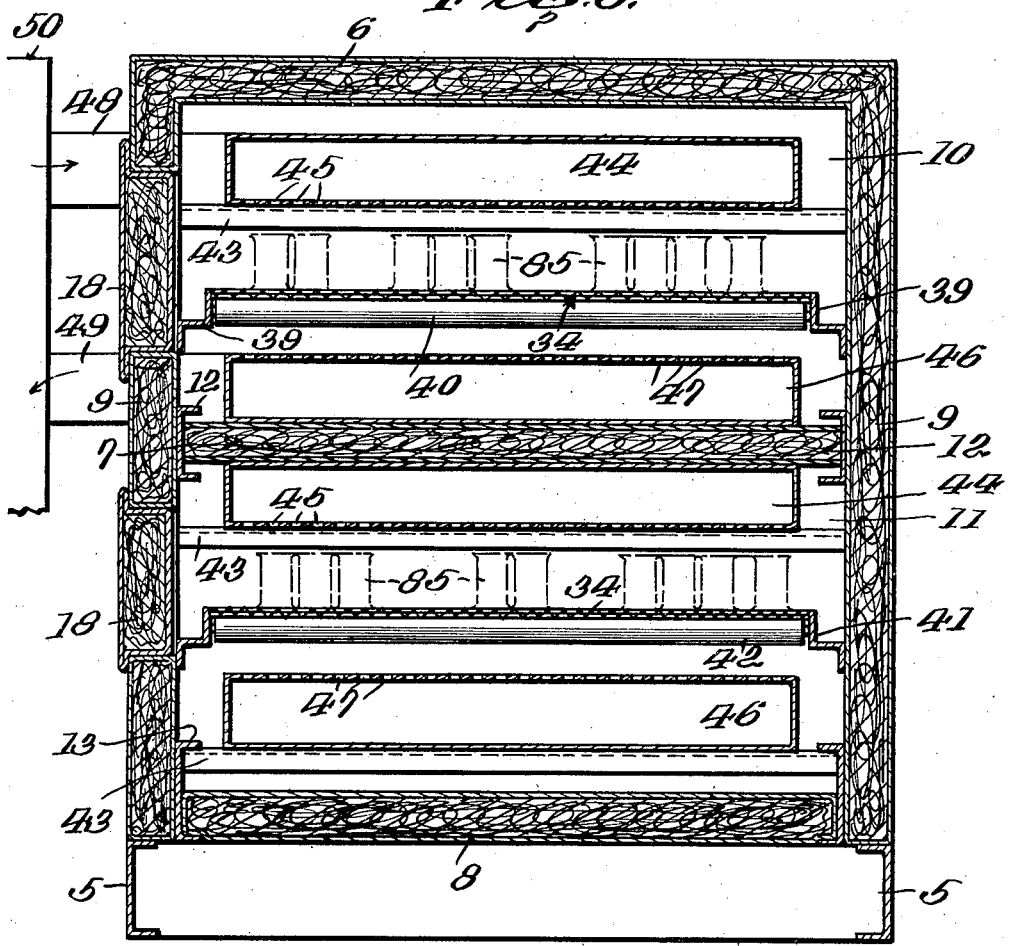
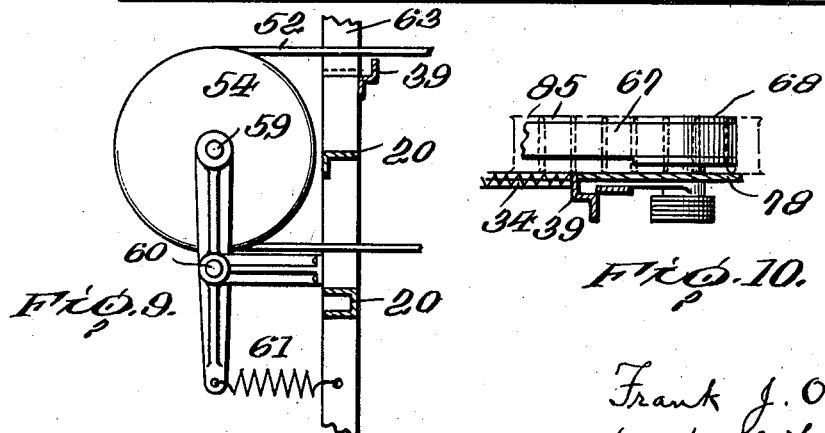
Inventors
Frank J. O'Brien
Alfred L. Kronquest
By Mason & Porter
Attorneys Patented Nov. 19, 1940

2,222,514

UNITED STATES PATENT OFFICE 2,222,514

DOUBLE TIER OVEN

Frank J. O'Brien, New York, and Alfred L. Kronquest, Syracuse, N. Y., assignors to Continental Can Company, Inc., New York, N. Y., a corporation of New York Application May 11, 1938, Serial No. 207,408

10 Claims. (Cl. 34—12)

The invention relates generally to ovens and primarily seeks to provide a novel double tier oven structure in which the enamel or lacquer protective coatings applied to beer cans or the like can be baked more economically and with greater facility than heretofore.

It is desirable to protect certain beverages, such as beer, against direct contact with the metal of cans in which they are sold. For this purpose the can bodies are coated internally, or both internally and externally, with a suitable protective coating such as lacquer or enamel. This coating is accomplished by spraying, dipping, flooding, or in any other suitable manner, and before the operations incident to the finishing of the cans can be performed, the coated can bodies must be dried and baked. Ovens have heretofore been devised for baking the can coatings but such ovens have consumed an unnecessary amount of space, the temperature in the ovens has been difficult to control and the operation of such ovens has been inefficient and relatively expensive. The invention has for an object to provide a novel double tier oven which is free of all of the objectionable characteristics noted.

An object of the invention is to provide an oven of the character stated embodying upper and lower tiers or heat chambers, and a single endless conveyor having upper and lower can conveying flights movable individually through the respective oven tiers.

Another object of the invention is to provide novel reversely directed upper and lower sets of feed-in and discharge mechanism for feeding cans unbaked onto and for discharging baked cans from the upper and lower conveyor flights.

Another object of the invention is to provide novel hot air flow and return ducts respectively positioned above and below the conveyor flights in the respective individual upper and lower oven tiers.

Another object of the invention is to provide a novel form of can conveyor and mounting means therefor serving to dispose the traveling conveyor flights each between the flow and return ducts in a given oven tier.

With the above and other objects in view which will hereinafter appear, the nature of the invention will be more fully understood by following the detailed description, the appended claims, and the several views illustrated in the accompanying drawings.

In the drawings—

Figure 1 is a plan view of an oven embodying the invention, parts being broken away.

Figure 2 is an enlarged detail plan view of the upper tier feeding mechanism.

Figure 3 is an enlarged detail plan view of the upper tier discharging mechanism.

Figures 4 and 5 are enlarged detail side elevations of the mechanisms shown respectively in Figures 2 and 3.

Figure 6 is a detail vertical cross section of the oven taken on the line 6—6 on Figure 1.

Figure 7 is an enlarged detail plan view of a fragment of the mesh conveyor.

Figure 8 is an enlarged detail vertical longitudinal section of a fragment of the mesh conveyor.

Figure 9 is a detail vertical cross section taken on the line 9—9 on Figure 4.

Figure 10 is a detail vertical cross section taken on the line 10—10 on Figure 2.

The oven herein disclosed embodies a suitable base framing 5, an insulated top wall 6, an intermediate division wall 7, a bottom wall 8, and side and end walls 9 forming an upper tier or heat chamber 10 and a lower tier or heat chamber 11.

The framing may include intermediate longitudinal channels 12 and lower longitudinal channels 13, and the end walls 9 are provided with openings 14 and 15 leading into and out of the upper chamber 10, and openings 16 and 17 leading into and out of the lower chamber 11. Suitable side openings, closed by doors 18, may be provided in the side walls 9, as shown in Figure 6 of the drawings.

End framing generally designated 19 is extended at the right hand end of the oven, and end framing generally designated 20 is similarly extended at the left hand end of the oven. See Figures 3, 5 and 2, 4.

A slideway 21 is formed in the framing 19 for a pair of opposed bearing blocks 22 supporting the shaft 23 of a driver drum 24 equipped with a peripherally disposed traction blanket 25 of rubber or similar yieldable material. A worm wheel 26 is secured to the drum shaft and is driven by a worm 27 through suitable power transmitting connections including a clutch 28 from the driving motor 29.

The extension framing 20 provides a slideway 30 for a pair of bearing blocks 31 which support the shaft 32 of an idler drum 33. The driver drum 24 and the idler drum 33 serve as end supports, and drive means, for an endless conveyor generally designated 34. The blocks 31 are suitably tensioned to hold the conveyor taut. Tensioning springs 35 attached to the blocks and anchored as at 36 serve the purpose of tensioning the conveyor. It will be observed by reference to Figures 7 and 8 of the drawings that the conveyor is of mesh construction so as to permit air to pass freely therethrough, and it may be formed of a multiplicity of transverse, somewhat flattened, coils 37 connected by cross wires 38.

A pair of laterally opposite Z-angles 39 are mounted in the upper oven chamber 10 and support idler rolls 40 at equidistantly spaced intervals along the oven chamber and directly beneath the upper flight of the conveyor 34 so as to form supports for the portion of the conveyor lying intermediate the drums 24 and 33. Similar angles 41 and idler rollers 42 serve to support the lower flight of the conveyor in the lower oven chamber 11.

Mounted on suitable supporting angles 43 in each of the oven chambers 10 and 11 is an upper air flow duct 44 having downwardly directed apertures 45, and a lower air return duct 46 having upwardly directed apertures 47. It will be observed that each flight of the conveyor 34 is spaced between flow and return ducts 44, 46. See Figures 4, 5 and 6 of the drawings. It will also be noted by reference to Figure 1 of the drawings that each flow duct 44 is connected by an inlet duct 48, and each return duct 46 by an outlet duct 49, with a heat control unit 50 disposed adjacent each entrance end of the chambers 10 and 11. Since the upper and lower flights of the conveyor 34 move in opposite directions through the upper and lower oven chambers 10 and 11, the heat controlling units 50 are disposed adjacent opposite ends of the oven, as shown in Figure 1. Any suitable means, (not shown) for heating and circulating the air may be connected in or with the units 50, 50.

Reversely directed upper and lower sets of feed-in and discharge mechanisms are associated with the upper and lower conveyor flights so as to feed unbaked cans onto and off from the respective conveyor flights. Each feed-in unit, generally designated 51, includes a cross feed endless belt 52 which traverses the respective conveyor flight and lies closely adjacent and directly above said flight. The belt passes over a driver pulley 53 and an idler pulley 54, the former being stationarily supported as at 55 and suitably driven by a pulley and belt equipment 56 and suitable reduction gearing 57 from the motor 58, and the latter being supported on a bearing hanger 59 pivoted intermediate its ends as at 60 to a portion of the framing, and having its other end engaged by an anchored belt tensioning spring 61.

A deflector bar 62 supported on brackets 63 secured to the framing serves to deflect in-feeding cans from the belt 52 onto the traveling conveyor 34, and a head plate 64 overlying the belt serves to guide the cans as they are being fed and includes a depressed portion 65 for engaging and controlling the cans as they pass off the belt onto the conveyor 34.

As the traveling belt 34 and the cans supported thereon reach the discharge end of the respective oven chamber, they are laterally guided by rails 66 against one flight of a vertically disposed discharge belt 67, the engaged belt flight being disposed angularly across the conveyor 34 and supported upon pulleys 68 and 69. The pulley 69 is an idler and is supported as at 70 on the framing, and the driving pulley 68 is supported at 71 on the framing and driven by a pulley and belt equipment 72 from the motor 73 supported as at 74 on the framing.

The flight of the belt 67 engaged by the cans being discharged is yieldably backed by a bar 75 supported as at 76 on the framing and faced with a plurality of leaf springs 77 presented for yieldable engagement with the belt flight.

The discharge end of the belt 67 is extended laterally a distance beyond the conveyor edge where it delivers onto a discharge chute 78 which receives the discharged cans as they pass off the edge of the conveyor 34. The extended portion of the belt 67 is opposed by a cooperating endless belt 79 disposed in parallel relation at the opposite side of the chute 78 and supported on an idler pulley 80 mounted at 81 on the framing and a driver pulley 82 supported at 83 on the framing. The pulley 82 is driven by suitable belt transmission connection 84 from the driver 68.

The coated can bodies are generally designated 85 and usually take the form of open-ended cylinders or shells, as shown in Figure 6 of the drawings. It will be observed that hot air passing out through the apertures 45 of the flow ducts will pass down through the cans 85, through the meshes of the respective chain flight and through the apertures 47 into the respective return duct 46.

The cans fed in batches to the oven will be fed in by the respective belts 52 and deflected from the belts onto the upper and lower conveyor flights at opposite ends of the oven. The cans will then be conveyed slowly through the oven and have the hot drying and baking air circulated through them as hereinbefore described, the cans on the respective conveyor flights traveling in opposite directions, and when the cans pass out at the discharge ends of the chambers they will be engaged by the belt 67 and discharged laterally in the manner above described.

It is of course to be understood that the details of structure and arrangement of parts may be variously changed and modified without departing from the spirit and scope of our invention.

Having thus described the invention, what we claim as new and desire to secure by Letters Patent, is—

1. In a can baking oven, means providing individual chambers disposed longitudinally and one above the other and completely isolated one from the other, heating means for each chamber, an endless conveyor projecting outside of the chambers at both ends of the latter including an upper flight effective to move cans through the upper chamber and a lower flight effective to move cans through the lower chamber, means outside of said chambers adjacent opposite ends thereof to place cans on said flights, and means outside of the chambers adjacent the other ends thereof to remove cans from said flights.

2. In a can baking oven, means providing individual chambers disposed longitudinally and one above the other and completely isolated one from the other, an endless conveyor projecting outside of the chambers at both ends of the latter including an upper flight effective to move cans through the upper chamber and a lower flight effective to move cans through the lower chamber, means outside of said chambers adjacent opposite ends thereof to place cans on said flights, means outside of said chambers adjacent the other ends thereof to remove cans from said flights, and independent heating means for heating each chamber including a hot air flow duct and an air return duct disposed at opposite faces along each conveyor flight, said ducts having air passing apertures therein directed toward the respective conveyor flights.

3. In a can baking oven, means providing individual chambers disposed longitudinally and one above the other and completely isolated one from the other, an endless conveyor projecting outside of the chambers at both ends of the latter including an upper flight effective to move cans through the upper chamber and a lower flight effective to move cans through the lower chamber, means outside of said chambers adjacent opposite ends thereof to place cans on said flights, means outside of said chambers adjacent the other ends thereof to remove cans from said flights, independent heating means for heating each chamber including a hot air flow duct and an air return duct disposed at opposite faces along each conveyor flight, said ducts having air passing apertures therein directed toward the respective conveyor flights, and a heat control unit disposed adjacent the entrance into each oven chamber and connected at that point with the flow and return ducts of the respective chamber.

4. In a can baking oven, means providing individual isolated chambers disposed longitudinally and one above the other, heating means for each chamber, an endless conveyor including an upper flight effective to move cans in one direction through the upper chamber and a lower flight effective to move cans in the opposite direction through the lower chamber, and upper and lower reversely disposed sets of feed-in and discharge means, each such set being effective for feeding unbaked cans onto and for discharging baked cans from one flight of said conveyor.

5. In a can baking oven, means providing individual isolated heat chambers disposed longitudinally and one above the other, an endless conveyor including an upper flight effective to move cans through the upper chamber and a lower flight effective to move cans through the lower chamber, independent heating means for heating each chamber including a hot air flow duct and an air return duct disposed at opposite faces along each conveyor flight, said ducts having air passing apertures therein directed toward the respective conveyor flights, and said conveyor being formed of open mesh construction to permit air circulating through said apertures to pass through the flights thereof, a heat control unit disposed adjacent the entrance into each oven chamber and connected at that point with the flow and return ducts of the respective chamber, and upper and lower reversely disposed sets of feed-in and discharge means, each such set being effective for feeding unbaked cans onto and for discharging baked cans from each flight of said conveyor.

6. A loading means for an oven of the character described and including a heat chamber having an entrance, and an endless conveyor movable through the entrance for moving cans into the oven, said loading means including an endless belt for feeding cans onto the conveyor and having a flight disposed to traverse the conveyor in close relation to the feeding flight thereof, means for imparting movement to the belt, a bar disposed above and in angular relation to the belt to deflect cans off the belt onto the conveyor, and an abutment plate overlying the belt to guide movement of cans along and off said belt.

7. An unloading means for an oven of the character described and including a heat chamber having an outlet, and an endless conveyor movable through the outlet for moving cans out of the oven, said unloading means including an endless belt for discharging cans from said conveyor and having one flight which is disposed vertically across the conveyor at an angle to the direction of feed movement of said conveyor for being engaged by outfeeding cans and for moving said cans laterally off of the conveyor, and means for yieldably backing said angularly disposed belt flight.

8. An unloading means for an oven of the character described and including a heat chamber having an outlet, an endless conveyor movable through the outlet for moving cans out of the oven, said unloading means including an endless belt for discharging cans from said conveyor and having one flight which is disposed vertically across the conveyor at an angle to the direction of feed movement of said conveyor and extending a distance laterally beyond an edge of the conveyor for being engaged by outfeeding cans and for moving said cans laterally off of the conveyor, a conveyor chute paralleling the extended belt portion for receiving cans as they leave the conveyor, and a second belt having a flight disposed parallel the extended belt portion and movable in the same direction whereby said parallel belt portions will move cans discharged from the conveyor along said chute.

9. An unloading means for an oven of the character described and including a heat chamber having an outlet, an endless conveyor movable through the outlet for moving cans out of the oven, said unloading means including an endless belt for discharging cans from said conveyor and having one flight which is disposed vertically across the conveyor at an angle to the direction of feed movement of said conveyor and extending a distance laterally beyond an edge of the conveyor for being engaged by outfeeding cans and for moving said cans laterally off of the conveyor, a conveyor chute paralleling the extended belt portion for receiving cans as they leave the conveyor, a second belt having a flight disposed parallel the extended belt portion and movable in the same direction whereby said parallel belt portions will move cans discharged from the conveyor along said chute, and leaf spring means engaging said angularly disposed belt flight and the extension thereof.

10. In a can baking oven, means providing individual isolated heat chambers disposed longitudinally and one above the other, heating means for each chamber, an endless conveyor including an upper flight effective to move cans in one direction through the upper chamber and a lower flight effective to move cans in the opposite direction through the lower chamber, upper and lower reversely disposed sets of feed-in and discharge means, each such set being effective for feeding unbaked cans onto and for discharging baked cans from one flight of said conveyor, and each of said sets including a can feeding means comprising an endless belt having a flight disposed to traverse the conveyor in close relation to the respective feeding flight thereof, a pair of pulleys for supporting said belt, one a driver pulley and the other an idler pulley, means for tensioning the idler pulley to hold the belt taut, a bar disposed above and in angular relation to the belt to deflect cans off the belt onto the respective conveyor flight, and an abutment plate overlying the belt to guide movement of cans along and off said belt, and means for discharging cans from the respective conveyor flight comprising an endless belt one flight of which is disposed vertically across the conveyor at an angle to the direction of feed movement of said conveyor and extending a distance laterally beyond an edge of the conveyor for being engaged by outfeeding cans and for moving said cans laterally off of the conveyor, a conveyor chute paralleling each extended belt portion for receiving cans as they leave the respective conveyor flight, and a second belt having a flight disposed parallel each extended belt portion and movable in the same direction whereby said parallel belt portions will move cans discharged from the conveyor along said chute.

FRANK J. O'BRIEN.
ALFRED L. KRONQUEST.